Feb. 26, 1935.   E. B. LYNDE   1,992,495

FLEXIBLE VALVE MEMBER

Filed Feb. 15, 1933

Inventor:
Elwyn B. Lynde.
by Franklin E. Low
Att'y.

Patented Feb. 26, 1935

1,992,495

UNITED STATES PATENT OFFICE 1,992,495

FLEXIBLE VALVE MEMBER

Elwyn B. Lynde, Middleboro, Mass.

Application February 15, 1933, Serial No. 656,837

2 Claims. (Cl. 251—123)

This invention relates to an improvement in flexible valve members for certain types of valves and particularly for certain types of pumps.

The object of the invention is to provide a valve member constructed of flexible rubber or equivalent material and having a relatively rigid core embodied therein, said core being constructed of alternate layers of fabric and relatively hard rubber superimposed one upon another and encased within the central portion of the valve member in a manner to stiffen and strengthen the same.

Another object of the invention is to provide a valve member of the character mentioned constructed as a tongue and formed integral with an annular portion which functions as a gasket and is utilized as a means by which the valve member is secured to the device of which it forms a part.

The invention consists in an improved valve member as set forth in the following specification and particularly as pointed out in the claims thereof.

Referring to the drawing:—

Like numerals refer to like parts throughout the several views of the drawing.

Figure 1:
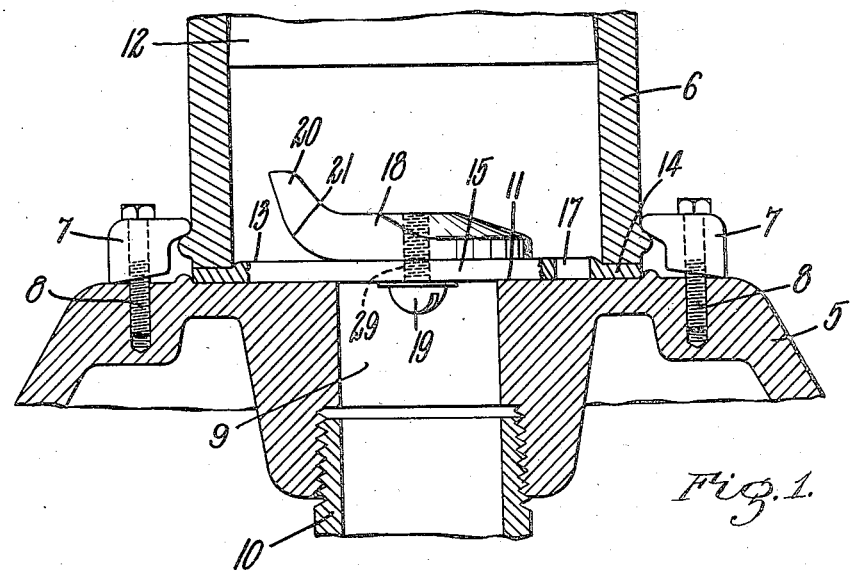
Fig. 1 represents a central vertical sectional elevation of a portion of a water pump having a valve member embodying my invention associated therewith.
Figure 2:
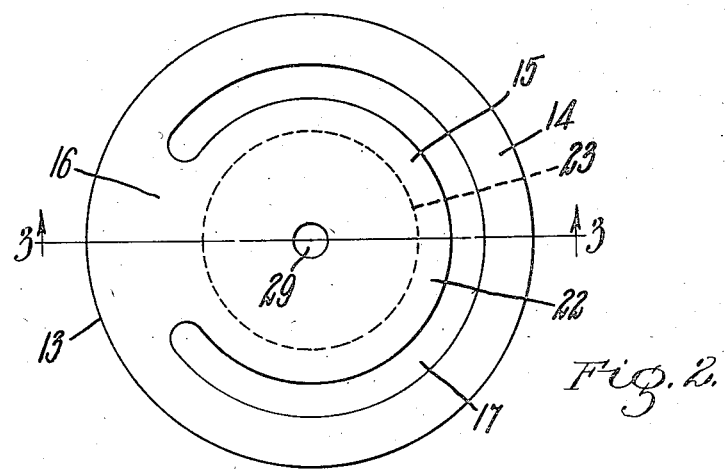
Fig. 2 is a plan view of a valve member embodying the invention.
Figure 3:
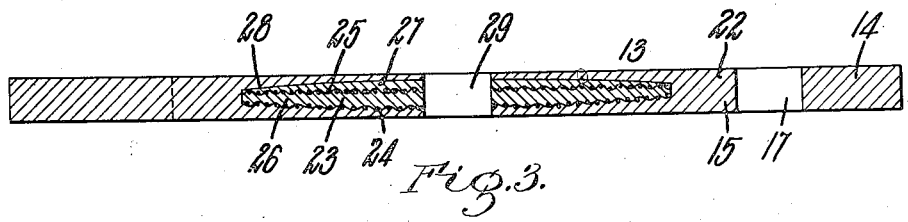
Fig. 3 is an enlarged detail section taken on the line 3—3 of Fig. 2.

In the drawing, 5 represents a portion of a base member and 6 a portion of a cylinder of a water pump of well-known form, said cylinder being clamped securely to said base by means of a plurality of clamping dogs 7 and screws 8. The base 5 has a port 9 provided therein and a water supply pipe 10 secured thereto and communicating with said port. A valve seat 11 is provided upon the upper surface of the base 5. A piston 12 of well-known form is provided for the cylinder 6.

Mounted upon the base 5 and clamped securely thereto in unison with the cylinder 6 is a valve member 13 which is adapted to prevent water which has been drawn upwardly into the cylinder 6 by means of the piston 12 from returning downwardly through the port 9 and supply pipe 10 to the source of supply therebeneath. The valve member 13 is constructed of flexible rubber or equivalent material and comprises an annular gasket portion 14 and a tongue 15, the latter being connected to the gasket portion by means of a neck portion 16. The tongue 15 is circular in outline and is positioned concentric with an annular gasket portion 14. A peripheral portion of the tongue 15 is separated from the interior surface of the gasket portion 14 by a space 17. A weight 18 is secured to the upper surface of the tongue 15 by means of a screw 19, and said weight 18 has a projecting portion 20 embodied therein having a curved surface 21 upon which the weight may rock at such times as the projection 20 is engaged by a lower edge portion of the piston 12 when it is desired to open the valve member and permit the water held within the cylinder to be discharged therefrom downwardly through the port 9 and water supply pipe 10.

The tongue 15 is in most part constructed of rubber having the same characteristics as the rubber of which the gasket portion 14 is composed and is flexible at its outer edge portion 22. A central area, however, of the tongue 15 has a core 23 encased therein which consists of layers of fabric 24 and 25 and discs 26 and 27 constructed of a relatively hard rubber, said layers of fabric and discs being superimposed one upon another within the tongue and preferably said layers are so formed that the core 23 will taper slightly at 28 towards its periphery. This will result in the tongue gradually increasing in flexibility toward its periphery. The layers of fabric, rubber discs and material of the remaining portion of the tongue 15 are all caused to cling one to another when the valve member is subjected to the vulcanizing operation and the tongue will be strengthened and stiffened throughout its central area and particularly around the hole 29 which extends therethrough and through which the screw 19 projects. At the same time the outer edge portion 22 of the tongue will be relatively flexible as compared to the central portion.

When in position, a portion of the gasket portion 14 is compressed between the base 5 and cylinder 6 and the valve member is securely clamped in such a position that the tongue 15 will rest upon the valve seat 11 and close the port 9.

By constructing the valve member 13 of a durable form of flexible rubber a far more practical device is provided than the devices that are in common use, as this material is less likely to become worn when it comes in contact with sand which may at times collect upon the valve seat 11. Furthermore, if foreign particles such as sand or gravel do collect upon the seat 11 they will not adhere or cling to or even penetrate the rubber of the tongue 15, but said rubber will compress or cup therearound and form an effective seal to prevent leakage between the tongue and seat and these foreign particles will immediately become disengaged from the tongue when the water is again caused to flow thereby. By reinforcing the central portion of the tongue 15 that portion of said tongue which closes the port 9 and is subjected to the downward pulling action of the water which is held therebeneath is very much strengthened. At the same time the outer edge portion 22 of the tongue which it is desirable to have flexible retains this property.

I claim:

1. A valve member of the character described constructed of material having the characteristics of rubber and embodying therein a flexible tongue, a plurality of layers of fabric located within the central area of said tongue, and a relatively rigid disc positioned between said layers of fabric, said fabric and disc terminating at a point intermediate the center and periphery of said tongue and being of greater thickness at the center than at the edge thereof.

2. A device of the character described having, in combination, an annular gasket of material having the characteristics of rubber, a concentrically disposed valve member of like material formed integral therewith, a plurality of layers of fabric located within the central area of said valve member, and a relatively rigid disc positioned between said layers of fabric, said fabric and disc terminating at a point intermediate the center and periphery of said tongue and being of greater thickness at the center than at the edge thereof.

ELWYN B. LYNDE.